(12) United States Patent
Cumbie et al.

(10) Patent No.: US 10,739,181 B2
(45) Date of Patent: *Aug. 11, 2020

(54) LIQUID LEVEL INDICATING

(71) Applicant: HEWLETT-PACKARD DEVELOPMENT COMPANY, L.P., Houston, TX (US)

(72) Inventors: Michael W. Cumbie, Albany, OR (US); Robert N. K. Browning, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/129,169

(22) Filed: Sep. 12, 2018

(65) Prior Publication Data

US 2019/0011306 A1    Jan. 10, 2019

Related U.S. Application Data

(63) Continuation of application No. 15/839,587, filed on Dec. 12, 2017, now Pat. No. 10,107,667, which is a
(Continued)

(51) Int. Cl.
*G01F 23/24* (2006.01)
*B41J 2/175* (2006.01)
(Continued)

(52) U.S. Cl.
CPC ........ *G01F 23/248* (2013.01); *B41J 2/17513* (2013.01); *B41J 2/17566* (2013.01);
(Continued)

(58) Field of Classification Search
CPC .... G01F 23/246; G01F 23/247; G01F 23/248; B41J 2/17566; B41J 2002/17579
See application file for complete search history.

(56) References Cited

U.S. PATENT DOCUMENTS

| 4,129,848 A | 12/1978 | Frank et al. |
| 4,771,271 A | 9/1988 | Zanini-Fisher |

(Continued)

FOREIGN PATENT DOCUMENTS

| EP | 0571127 | 11/1993 |
| GB | 2302946 | 2/1997 |

(Continued)

OTHER PUBLICATIONS

Korean Intellectual Property Office, International Search Report and Written Opinion dated Jul. 27, 2016 (13 pages).

(Continued)

*Primary Examiner* — Paul M. West
(74) *Attorney, Agent, or Firm* — Trop Pruner & Hu PC

(57) ABSTRACT

In some examples, a liquid container comprises a chamber forming a volume containing a liquid, an elongated strip extending into the volume containing the liquid, the strip supported along a side of the volume such that a face of the strip adjacent the side of the volume is not opposed by the liquid, a plurality of heaters supported by the strip along the strip, and a plurality of temperature sensors supported by the strip along the strip.

20 Claims, 7 Drawing Sheets

Related U.S. Application Data continuation of application No. PCT/US2015/057785, filed on Oct. 28, 2015.

(51) Int. Cl.
  *B41J 2/195* (2006.01)
  *G01F 23/22* (2006.01)
  *H05B 3/82* (2006.01)

(52) U.S. Cl.
  CPC .............. *B41J 2/195* (2013.01); *G01F 23/22* (2013.01); *G01F 23/246* (2013.01); *G01F 23/247* (2013.01); *H05B 3/82* (2013.01); *B41J 2002/17579* (2013.01)

(56) References Cited

U.S. PATENT DOCUMENTS

| | | |
|---|---|---|
| 4,785,665 A | 11/1988 | McCulloch |
| 4,890,492 A | 1/1990 | Andrejasich et al. |
| 5,136,305 A | 8/1992 | Ims |
| 5,142,909 A | 9/1992 | Baughman |
| 5,719,332 A | 2/1998 | Wallrafen |
| 6,196,651 B1 | 3/2001 | Zuber et al. |
| 7,392,691 B1 | 7/2008 | Yeckley |
| 7,791,004 B2 | 9/2010 | Reusche et al. |
| 8,454,144 B2 | 6/2013 | Platt et al. |
| 9,052,227 B1 * | 6/2015 | Lassota .................. G01F 23/268 |
| 10,107,667 B2 * | 10/2018 | Cumbie .................. G01F 23/22 |
| 2002/0129650 A1 | 9/2002 | Zimmermann et al. |
| 2005/0120791 A1 | 6/2005 | Carlson et al. |
| 2005/0229699 A1 | 10/2005 | Chai |
| 2007/0113646 A1 | 5/2007 | Maatuk |
| 2008/0016960 A1 | 1/2008 | Zimmermann |
| 2010/0122575 A1 | 5/2010 | Stephens |
| 2014/0260520 A1 | 9/2014 | Schoenberg |

FOREIGN PATENT DOCUMENTS

| | | |
|---|---|---|
| JP | 01199124 | 8/1989 |
| JP | 01209322 | 8/1989 |
| JP | 05500571 | 2/1993 |
| JP | 05107099 | 4/1993 |
| JP | H-09101191 | 4/1997 |
| JP | 11153561 | 6/1999 |
| JP | 11237356 | 8/1999 |

OTHER PUBLICATIONS

Lexmark Using Inkjet Cartridge Chips and Spyware?, Oct. 18, 2007. URL: <http://www.fixyourownprinter.com/posts/51393> (325 pages).

* cited by examiner

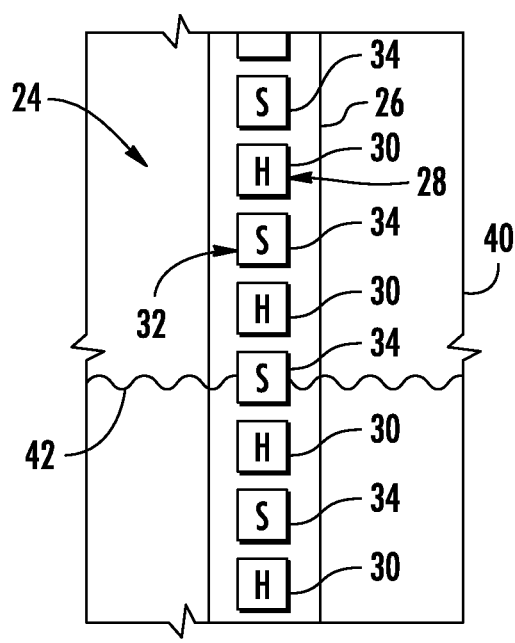
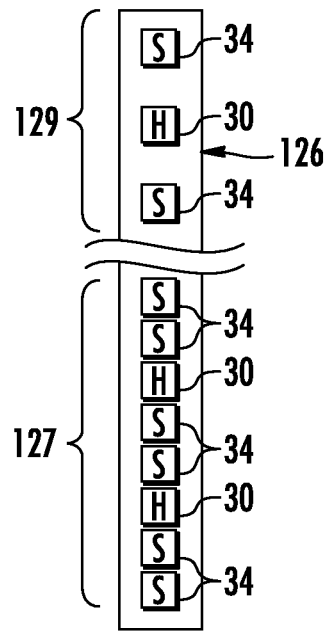
FIG. 1A
FIG. 1B
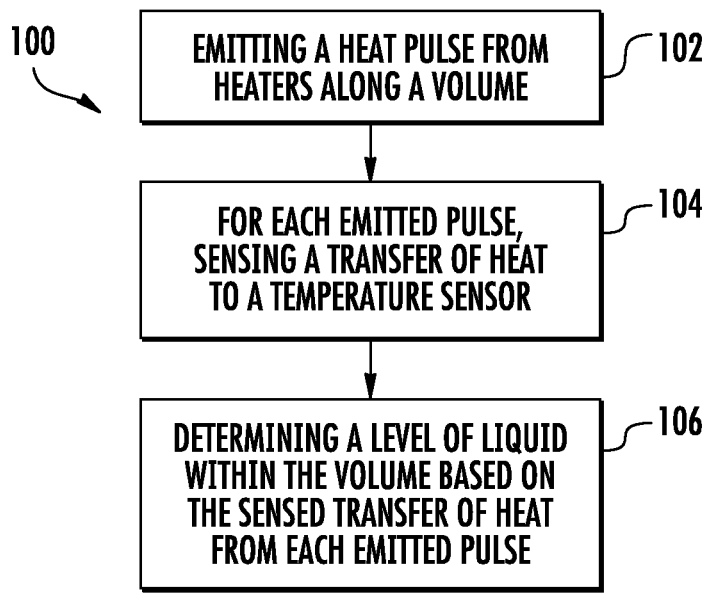
FIG. 2

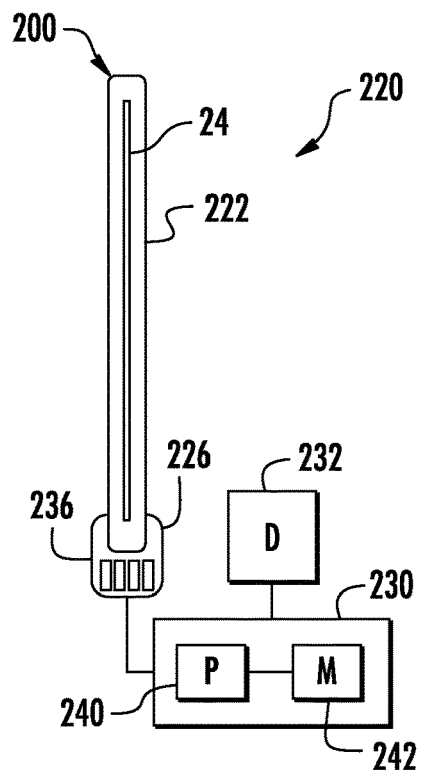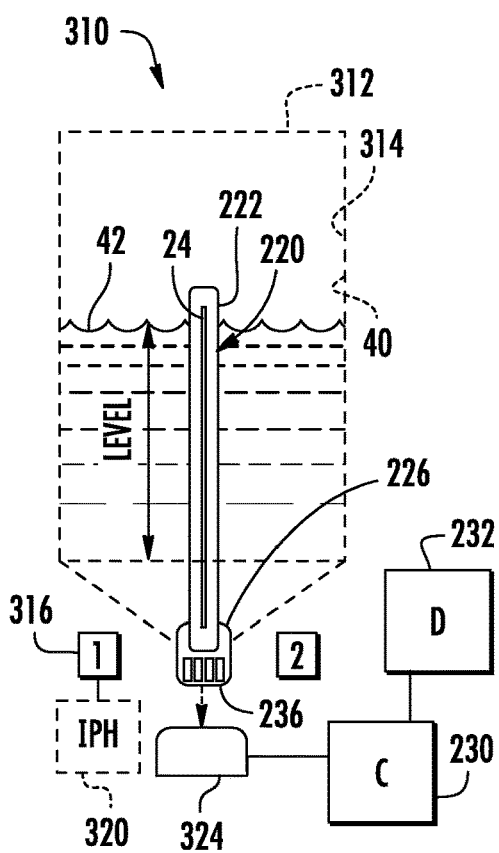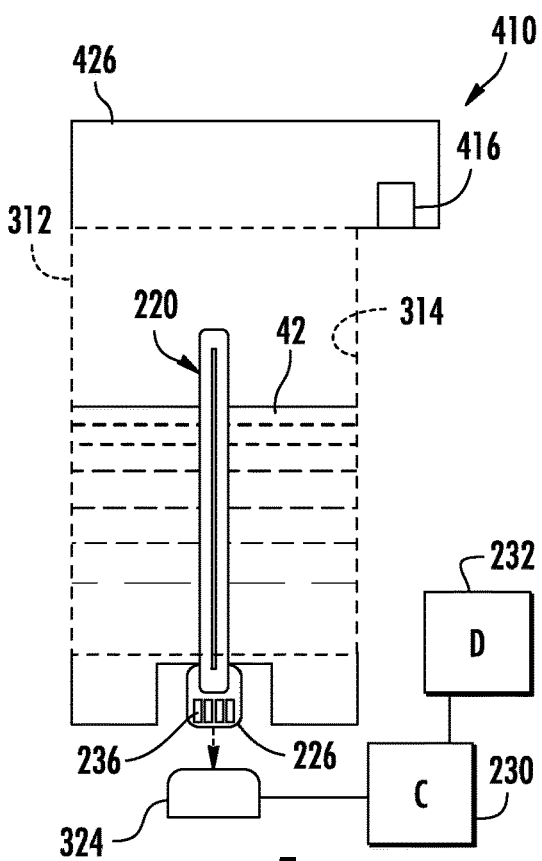
FIG. 3
FIG. 4
FIG. 5

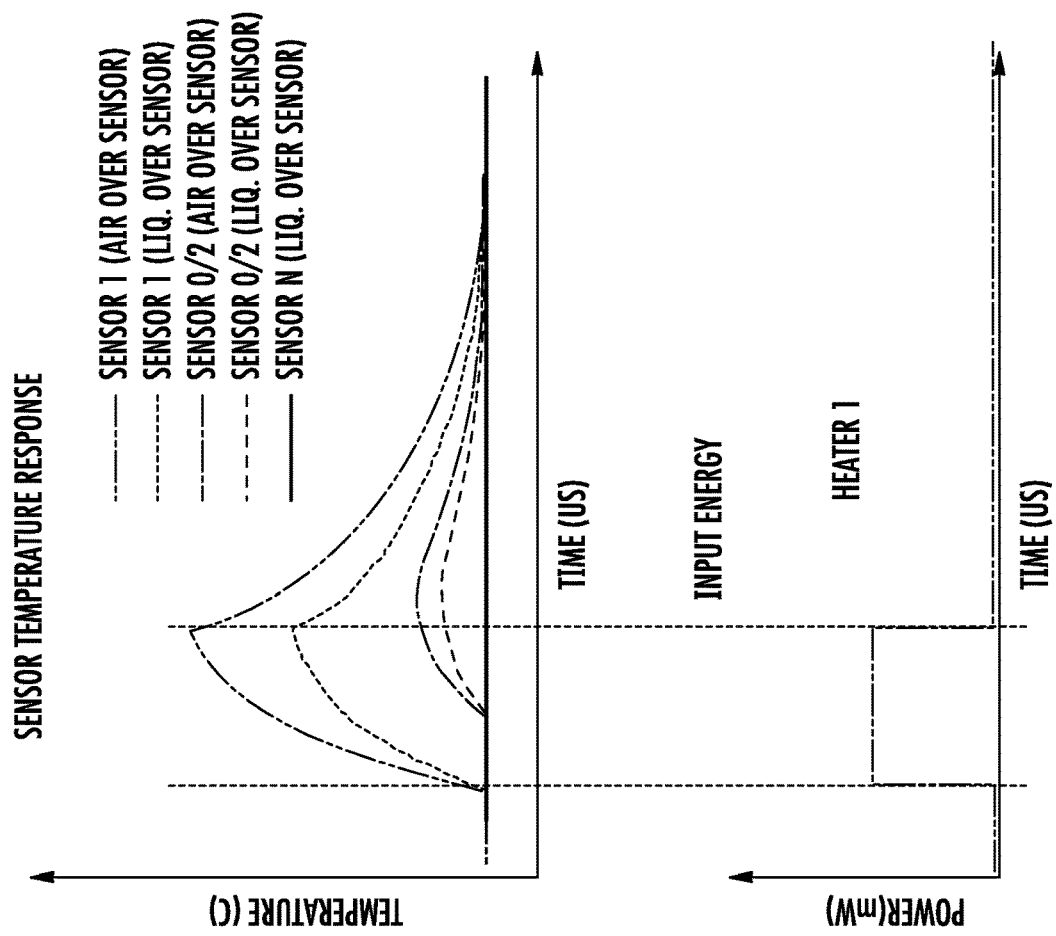
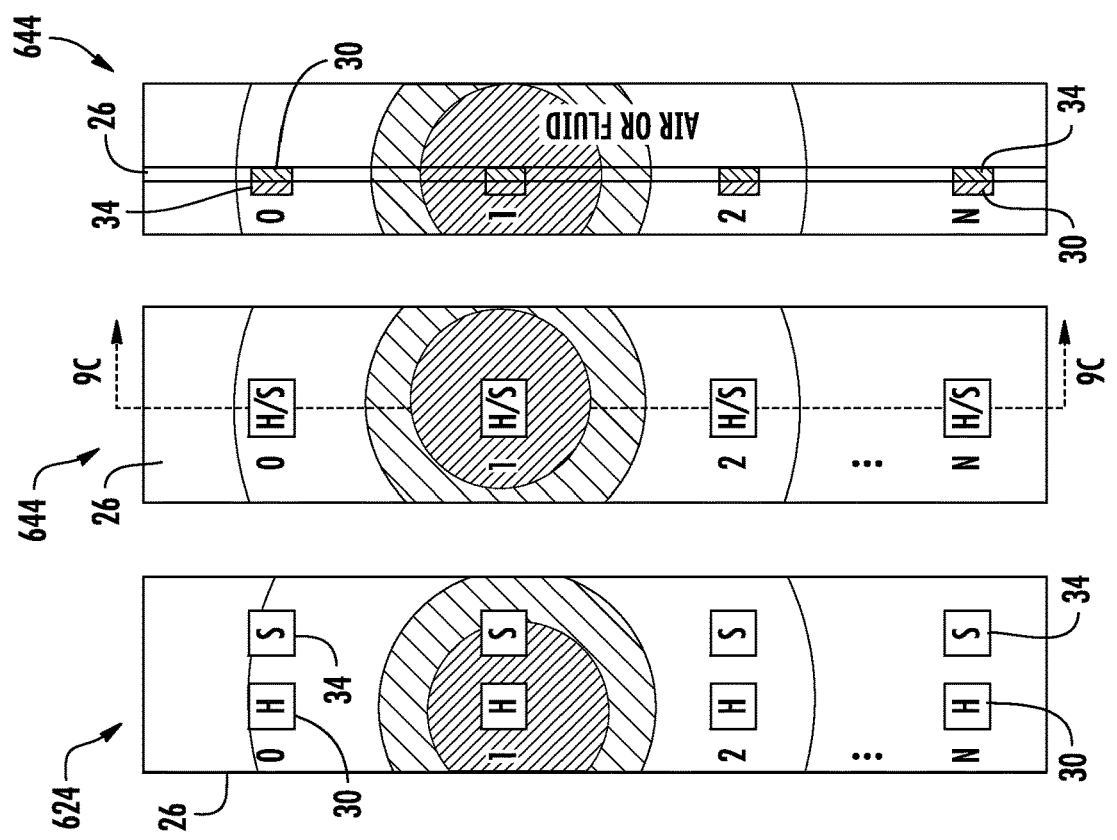
FIG. 9A  FIG. 9B  FIG. 9C  FIG. 10

LIQUID LEVEL INDICATING

CROSS REFERENCE TO RELATED APPLICATION

This is a continuation of U.S. application Ser. No. 15/839,587, filed Dec. 12, 2017, which is a continuation of International Application No. PCT/US2015/057785, filed Oct. 28, 2015, which are both hereby incorporated by reference in their entirety.

BACKGROUND

Various devices are presently employed to sense the level of a liquid within a volume. Some of these devices may be relatively complex and expensive to manufacture.

BRIEF DESCRIPTION OF THE DRAWINGS

FIG. 1A is a diagram of a portion of an example liquid interface for an example liquid level sensor.

FIG. 1B is a diagram of portions of another example liquid interface for an example liquid level sensor.

FIG. 2 is a flow diagram of an example method for determining a level of liquid using the liquid level sensor of the FIG. 1.

FIG. 3 is a diagram of an example liquid level sensing system.

FIG. 4 is a diagram of an example liquid supply system including the liquid level sensing system of FIG. 3.

FIG. 5 diagram of another example liquid supply system including the liquid level sensing system of FIG. 3.

FIG. 9A is a fragmentary front view of the liquid level sensor of FIG. 6, illustrating an example heat spike resulting from the pulsing of a heater.

FIG. 9B is a fragmentary front view of another example liquid level sensor, illustrating an example heat spike resulting from the pulsing of a heater.

FIG. 9C is a sectional view of the example liquid level sensor of FIG. 9B, illustrating the example heat spike resulting from the pulsing of the heater.

FIG. 10 is a graph illustrating an example of different sensed temperature responses over time to a heater impulse.

DETAILED DESCRIPTION OF EXAMPLES

Figure 6:
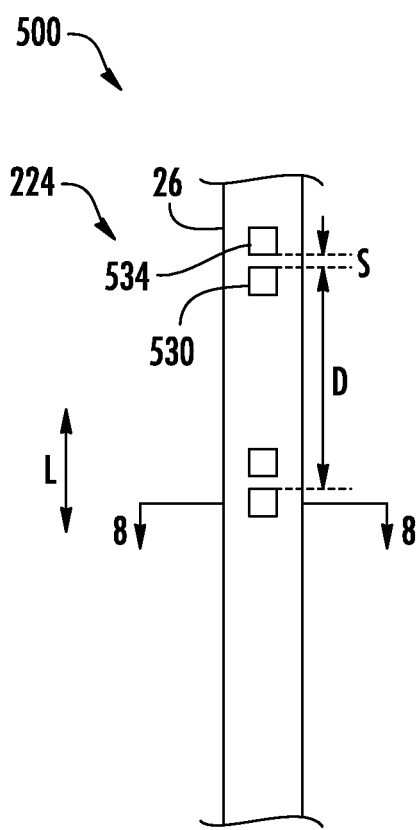
FIG. 6 is a diagram of a portion of another example liquid interface of a liquid level sensor.

Many existing devices that are currently used to sense the level of a liquid within a volume may be relatively complex and expensive to manufacture. For example, many presently available liquid level sensing devices utilize expensive componentry and expensive materials. Many presently available liquid level sensing devices involve dedicated complex manufacturing processes.

This disclosure describes various example liquid level sensing liquid interfaces that are less expensive to manufacture. As will be described hereafter, in some implementations, the disclosed liquid level sensing liquid interfaces facilitate the use of materials having a wide range of temperature coefficient of resistance. In some implementations, the disclosed liquid level sensing liquid interfaces are well adapted for sensing the level of otherwise corrosive liquids without using generally more expensive corrosive resistant materials.

FIG. 1A illustrates an example liquid level sensing interface 24 for a liquid level sensor. Liquid interface 24 interacts with liquid within a volume 40 and outputs signals that indicate the current level of liquid within the volume 40. Such signals are processed to determine the level of liquid within the volume 40. Liquid interface 24 facilitates the detection of the level of liquid within the volume 40 in a low-cost manner.

As schematically shown by FIG. 1A, liquid interface 24 comprises strip 26, a series 28 of heaters 30 and a series 32 of sensors 34. Strip 26 comprises an elongated strip that is to be extended into volume 40 containing the liquid 42. Strip 26 supports heaters 30 and sensors 34 such that a subset of the heaters 30 and sensors 34 are submersed within liquid 42, when liquid 42 is present.

In one implementation, strip 26 is supported (from the top or from the bottom) such that those portions of strip 26, and their supported heaters 30 and sensors 34, submersed within liquid 42, are completely surrounded on all sides by the liquid 42. In another implementation, strip 16 is supported along a side of the volume 40 such that a face of strip 26 adjacent the side of volume 40 is not opposed by the liquid 42. In one implementation, strip 26 comprises an elongated rectangular, substantially flat strip. In another implementation strip 26 comprises strip having a different polygon a cross-section or a circular or oval cross-section.

Heaters 30 comprise individual heating elements spaced along a length of strip 26. Each of heaters 30 is sufficiently close to a sensor 28 such that the heat emitted by the individual heater may be sensed by the associated sensor 28. In one implementation, each heater 30 is independently actuatable to emit heat independent of other heaters 30. In one implementation, each heater 30 comprises an electrical resistor. In one implementation, each heater 30 is to emit a heat pulse for duration of at least 10 µs with a power of at least 10 mW.

In the example illustrated, heaters 30 are employed to emit heat and do not serve as temperature sensors. As a result, each of heaters 30 may be constructed from a wide variety of electrically resistive materials having a wide range of temperature coefficient of resistance. A resistor may be characterized by its temperature coefficient of resistance, or TCR. The TCR is the resistor's change in resistance as a function of the ambient temperature. TCR may be expressed in ppm/° C., which stands for parts per million per centigrade degree. The temperature coefficient of resistance is calculated as follows:

temperature coefficient of a resistor: $TCR=(R2-R1)$
$e-6/R1*(T2-T1)$, where TCR is in ppm/° C., R1 is in ohms at room temperature, R2 is resistance at operating temperature in ohms, T1 is the room temperature in ° C. and T2 is the operating temperature in ° C.

Because heaters 30 are separate and distinct from temperature sensors 34, a wide variety of thin-film material choices are available in wafer fabrication processes for forming heaters 30. In one implementation, each of heaters 30 has a relatively high heat dissipation per area, high temperature stability (TCR<1000 ppm/° C.), and the intimate coupling of heat generation to the surrounding medium and heat sensor. Suitable materials can be refractory metals and their respective alloys such as tantalum, and its alloys, and tungsten, and its alloys, to name a few; however, other heat dissipation devices like doped silicon or polysilicon may also be used.

Sensors 34 comprise individual sensing elements spaced along the length of strip 26. Each of sensors 34 is sufficiently close to a corresponding heater 30 such that the sensor 34 may detect or respond to the transfer of heat from the associated or corresponding heater 30. Each of sensors 34 outputs a signal which indicates or reflects the amount of heat transmitted to the particular sensor 34 following and corresponding to a pulse of heat from the associated heater. The amount of the transmitted to the associated heater will vary depending upon the medium through which the heat was transmitted prior to reaching the sensor. Liquid will thermally conduct heat at a faster rate as compared to air. As a result, the differences between signals from sensors 34 indicate the level of liquid 42 within volume 40.

In one implementation, each of sensors 34 comprises a diode which has a characteristic temperature response. For example, in one implementation, each of sensors 34 comprises a P-N junction diode. In other implementations, other diodes may be employed or other temperature sensors may be employed.

In the example illustrated, heaters 30 and sensors 34 are supported by strip 26 so as to be interdigitated or interleaved amongst one another along the length of strip 26. For purposes of this disclosure, the term "support" or "supported by with respect to heaters and/or sensors and a strip means that the heaters and/or sensors are carried by the strip such that the strip, heaters and sensors form a single connected unit. Such heaters and sensors may be supported on the outside or within and interior of the strip. For purposes of this disclosure, the term "interdigitated" or "interleaved" means that two items alternate with respect to one another. For example, interdigitated heaters and sensors may comprise a first heater, followed by a first sensor, followed by a second heater, followed by a second sensor and so on.

In one implementation, an individual heater 30 may emit pulses of heat that are to be sensed by multiple sensors 34 proximate to the individual heater 30. In one implementation, each sensor 34 is spaced no greater than 20 μm from an individual heater 30. In one implementation, sensors 30 have a minimum one-dimensional density along strip 24 of at least 100 sensors 34 per inch (at least 40 sensors 34 per centimeter). The one dimensional density comprises a number of sensors per unit measure in a direction along the length of strip 26, the dimension of strip 26 extending to different depths, defining the depth or liquid level sensing resolution of liquid interface 24. In other implementations, sensors 30 have other one dimensional densities along strip 24. For example, in another implementation, sensors 34 have a one-dimensional density along strip 26 of at least 10 sensors per inch. In other implementations, sensors 34 may have a one-dimensional density along strip 26 on the order of 1000 sensors per inch (400 sensors per centimeter) or greater.

In some implementations, the vertical density or number of sensors per vertical centimeter or inch may vary along the vertical or longitudinal length of strip 26. FIG. 1B illustrates an example sensor strip 126 having a varying density of sensors 34 along its major dimension or launching a length. In the example illustrated, sensor strip 126 has greater density of sensors 34 in those regions along the vertical height or depth may benefit more from a greater degree of depth resolution. In the example illustrated, sensor strip 126 has a lower portion 127 having a first density of sensors 34 and an upper portion 129 having a second density of sensors 34, the second density being less than the first density. In such an implementation, sensor strip 126 provides a higher degree of accuracy or resolution as the level of the liquid within the volume approaches an empty state. In one implementation, lower portion 127 has a density of at least 40 sensors 34 per centimeter while upper portion 129 has a density of less than 10 sensors per centimeter, and in one implementation, 4 sensors 34 per centimeter. In yet other implementations, an upper portion or a middle portion of sensor strip 126 may alternatively have a greater density of sensors as compared to other portions of censor strip 126.

Each of heaters 30 and each of sensors 34 are selectively actuatable under the control of a controller. In one implementation, the controller is part of or carried by strip 26. In another implementation, the controller comprises a remote controller electrically connected to the heaters 30 on strip 26. In one implementation, interface 24 comprises a separate component from the controller, facilitating replacement of interface 24 or facilitating the control of multiple interfaces 24 by a separate controller.

FIG. 2 is a flow diagram of an example method 100 that may be carried out using a liquid interface, such as liquid interface 24, to sense and determine the level of a liquid within a volume. As indicated by block 102, control signals are sent to heaters 30 causing a subset of heaters 30 or each of heaters 30 to turn on and off so as to emit a heat pulse. In one implementation, control signals are sent to heaters 30 such that heaters 30 are sequentially actuated or turned on and off (pulsed) to sequentially emit pulses of heat. In one implementation, the heaters are sequentially turned on and off in order for example, in order from top to bottom along strip 26 or from bottom to top along strip 26.

In another implementation, heaters 30 are actuated based upon a search algorithm, wherein the controller identifies which of heaters 30 should be initially pulsed in an effort to reduce the total time or the total number of heaters that are pulsed to determine the level of liquid 42 within volume 40. In one implementation, the identification of what heaters 30 are initially pulsed is based upon historical data. For example, in one implementation, the controller consults a memory to obtain data regarding the last sensed level of liquid 42 within volume 40 and pulses those heaters 30 most proximate to the last sensed level of liquid 42 before pulsing other heaters 30 more distant from the last sensed level of liquid 42.

In another implementation, the controller predicts the current level of liquid 42 within volume 40 based upon the obtained last sensed level of liquid 42 and pulses those heaters 30 proximate to the predicted current level of liquid 42 within volume 44 pulsing other heaters 30 more distant from the predicted current level of liquid 42. In one implementation, the predicted current level of liquid 42 is based upon the last sensed level of liquid 42 and a lapse of time since the last sensing of the level of liquid 42. In another implementation, the predicted current level of liquid 42 is based upon the last sensed level of liquid 42 and data indicating the consumption or withdrawal of liquid 42 from the volume. For example, in circumstances where liquid interface 42 is sensing the volume of an ink in an ink supply, the predicted current level of liquid 42 may be based upon last sensed level of liquid 42 and data such as the number of pages printed using the ink or the like.

In yet another implementation, heaters 30 may be sequentially pulsed, wherein heaters proximate to a center of the depth range of volume 40 are initially pulsed and wherein the other heaters are pulsed in the order based upon their distance from the center of the depth range of volume 40. In yet another implementation, subsets of heaters 30 are concurrently pulsed. For example, a first heater and a second heater may be concurrently pulsed where the first heater and the second heater are sufficiently spaced from one another along strip 26 such that the heat emitted by the first heater is not transmitted or does not reach the sensor intended to sense transmission of heat from the second heater. Concurrently pulsing heaters 30 may reduce the total time for determining the level of liquid 42 within volume 40.

In one implementation, each heat pulse has a duration at least 10 μs and as a power of at least 10 mW. In one implementation, each heat pulse has a duration of between 1 and 100 μs and up to a millisecond. In one implementation, each heat pulse has a power of at least 10 mW and up to and including 10 W.

As indicated by block 104 in FIG. 2, for each emitted pulse, an associated sensor 34 senses the transfer of heat from the associated heater to the associated sensor 34. In one implementation, each sensor 34 is actuated, turned on or polled following a predetermined period of time after the pulse of heat from the associated heater. The period of time may be based upon the beginning of the pulse, the end of the pulse or some other time value related to the timing of the pulse. In one implementation, each sensor 34 senses heat transmitted from the associated heater 30 beginning at least 10 μs following the end of the heat pulse from the associated heater 30. In one implementation, each sensor 34 senses heat transmitted from the associated heater 30 beginning 1000 μs following the end of the heat pulse from the associated heater 30. In another implementation, sensor 34 senses 34 initiates the sensing of heat after the end of the heat pulse from the associated heater following a period of time equal to a duration of the heat pulse, wherein such sensing occurs for a period of time of between two to three times the duration of the heat pulse. In yet other implementations, the time delay between the heat pulse and the sensing of heat by the associated sensor 34 may have other values.

As indicated by block 106 in FIG. 2, the controller or another controller determines a level of the liquid 42 within the volume 40 based upon the sensed transfer of heat from each emitted pulse. For example, liquid may transfer or transmit heat at a higher rate as compared to air. If the level of liquid 42 within volume 40 is such that liquid is extending between a particular heater 30 and its associated sensor 34, heat transfer from the particular heater 32 is associated sensor 34 will be faster as compared to circumstances where air is extending between the particular heater 30 and its associated sensor 34. Based upon the amount of heat sensed by the associated sensor 34 following the emission of the heat pulse by the associated heater 30, the controller determines whether air or liquid is extending between the particular heater 30 and the associated sensor. Using this determination and the known location of the heater 30 and/or sensor 34 along strip 26 and the relative positioning of strip 26 with respect to the floor of volume 40, the controller determines the level of liquid 42 within volume 40. Based upon the determined level of liquid 42 within volume 40 and the characteristics of volume 40, the controller is further able to determine the actual volume or amount of liquid remaining within volume 40.

In one implementation, the controller determines the level of liquid within the volume 40 by consulting a lookup table stored in a memory, wherein the lookup table associates different signals from sensors 34 with different levels of liquid within volume 40. In yet another implementation, controller determines level liquid within volume 40 by utilizing signals from 34 as input to an algorithm or formula.

In some implementations, method 100 and liquid interface 32 may be used to not only determine an uppermost level or top surface of liquid within volume 40, but also determine different levels of different liquids concurrently residing in volume 40. For example, due to different densities or other properties, different liquids may layer upon one another while concurrently residing in a single volume 40. Each of such different liquids may have a different heat transfer characteristic. In such an application, method 100 and liquid interface 24 may be used to identify where the layer of a first liquid ends within volume 40 and where the layer of a second different liquid, underlying or overlying the first liquid, begins.

In one implementation, the determined level (or levels) of liquid within the volume 40 and/or the determined volume or amount of liquid within volume 40 is output through a display or audible device. In yet other implementations, the determined level of liquid or the volume of liquid is used as a basis for triggering an alert, warning or the like to user. In some implementations, the determined level of liquid or volume of liquid is used to trigger the automatic reordering of replenishment liquid or the closing of a valve to stop the inflow of liquid into the volume 40. For example, in printers, the determined level of liquid within volume 40 may automatically trigger reordering of the replacement ink cartridge or replacement ink supply.

FIG. 3 illustrates an example liquid level sensing system 220. Liquid level sensing system 220 comprises carrier 222, liquid interface 24 (described above), electrical interconnect 226, controller 230 and display 232. Carrier 222 comprises a structure that supports strip 26. In one implementation, carrier 222 comprises a strip formed from, or comprise, a polymer, glass or other material. In one implementation, carrier 222 has embedded electrical traces or conductors. For example, in one implementation, carrier 222 comprises composite material composed of woven fiberglass cloth with an epoxy resin binder. In one implementation, carrier 222 comprises a glass-reinforced epoxy laminate sheet, tube, rod or printed circuit board.

Liquid interface 24, described above, extends along a length of carrier 222. In one implementation, liquid interface 24 is glued, bonded or otherwise affixed to carrier 222. In some implementations, depending upon the thickness and strength of strip 26, carrier 222 may be omitted.

Electrical interconnect 226 comprises an interface by which signals from the sensors 34 (shown in FIG. 1) of interface 24 are transmitted to controller 230. In one implementation, electrical interconnect 226 comprises electrical contact pads 236. In other implementations, electrical interconnect 226 may have other forms. Electrical interconnect 226, carrier 222 and strip 24, collectively, form a liquid level sensor 200 that may be incorporated into and fixed as part of a liquid container volume or may be a separate portable sensing device which may be temporarily manually inserted into different liquid containers or volumes.

Controller 230 comprises a processing unit 240 and associated non-transient computer-readable medium or memory 242. In one implementation, controller 230 is separate from liquid level sensor 200. In other implementations, controller 230 is incorporated as part of sensor 200. Processing unit 240 files instructions contained in memory 242. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 230 may be embodied as part of one or more application-specific integrated circuits (ASICs). Unless otherwise specifically noted, the controller is not limited to any specific combination of hardware circuitry and software, nor to any particular source for the instructions executed by the processing unit.

Processing unit 240, following instructions contained in memory 242 carries out method 100 shown and described above with respect to FIG. 2. Processor 240, following instructions provided in memory 242, selectively pulses heaters 30. Processor 240, following instructions provided in memory 242, obtains data signals from sensors 34, or in the data signals indicate dissipation of heat from the pulses and the transfer of heat to the sensors 34. Processor 240, following instructions provided in memory 242, determines a level of liquid within the volume based upon the signals from sensors 34. As noted above, in some implementations, controller 230 may additionally determine an amount or volume of liquid using characteristics of the volume or chamber containing a liquid. In one implementation, Display 232 receives signals from controller 230 and presents visible data based upon the determined level of liquid and/or determined volume or amount of liquid within the volume. In one implementation, display 232 presents an icon or other graphic depicting a percentage of the volume that is filled with the liquid. In another implementation, display 232 presents an alphanumeric indication of the level of liquid or percent of the volume that is filled with the liquid or that has been emptied of the liquid. In yet another implementation, display 232 presents an alert or "acceptable" status based on the determined level liquid within the volume. In yet other implementations, display 232 may be omitted, wherein the determined level of liquid within the volume is used to automatically trigger an event such as the reordering of replenishment liquid, the actuation of a valve to add a liquid to the volume or the actuation of valve to terminate the ongoing addition of liquid to the volume.

FIG. 4 is a sectional view illustrating liquid level sensing system 220 incorporated as part of a liquid supply system 310. Liquid supply system 310 comprises liquid container 312, chamber 314 and fluid or liquid ports 316. The container 312 defines chamber 314. Chamber 314 forms an example volume 40 in which liquid 42 is contained. As shown by FIG. 4, carrier 222 and liquid interface 24 project into chamber 314 from a bottom side of chamber 314, facilitating liquid level determinations as chamber 314 nears a state of being completely empty. In other implementations, carrier 222 in liquid interface 24 may alternatively be suspended from a top of chamber 314.

Liquid ports 316 comprise liquid passes by which liquid from within chamber 314 is delivered are directed to an external recipient. In one implementation, liquid ports 316 comprise a valve or other mechanism facilitating selective discharge of liquid from chamber 314. In one implementation, liquid supply system 310 comprises an off-axis ink supply for a printing system. In another implementation, liquid supply system 310 additionally comprises a print head 320 which is fluidly coupled to chamber 314 to receive liquid from chamber 314 through liquid interface 316. For example, in one implementation, liquid supply system 310, including print head 320, may form a print cartridge. For purposes of this disclosure, the term "fluidly coupled" means that two or more fluid transmitting volumes are connected directly to one another or are connected to one another by intermediate volumes or spaces such that fluid may flow from one volume into the other volume.

In the example illustrated in FIG. 4, communication between controller 230, which is remote or separate from liquid supply system tuner and 10, is facilitated via a wiping connector 324 such as a universal serial bus connector or other type of connector. Controller 230 and display 232 operate as described above.

FIG. 5 is a sectional view illustrating liquid supply system 410, another example implementation of liquid supply system 310. Liquid supply system 410 is similar to liquid supply system 310 except that liquid supply system 410 comprises liquid port 416 in place of liquid port 316. Liquid port 416 is similar to liquid interface 316 except that liquid port 416 is provided in a cap 426 above chamber 314 of container 312. Those remaining components of system 410 which correspond to components of system 310 are numbered similarly.

Figure 7:
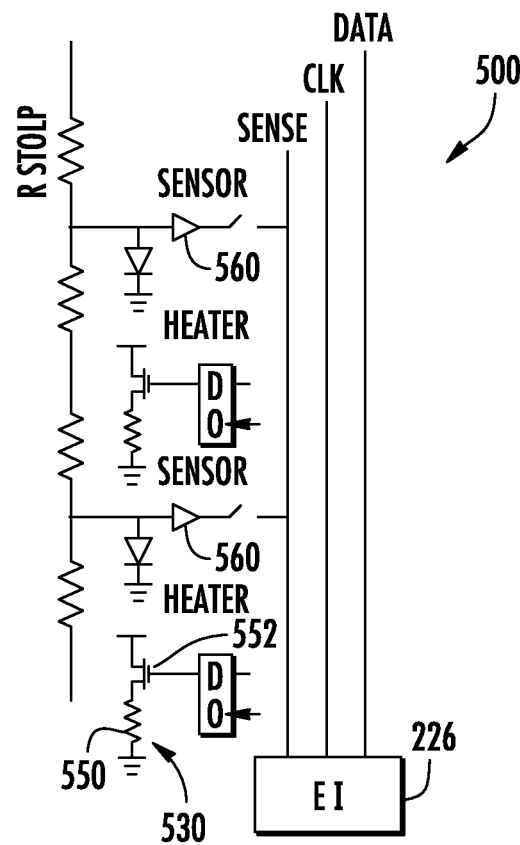
FIG. 7 is an example circuit diagram of the liquid level sensor of FIG. 6.
Figure 8:
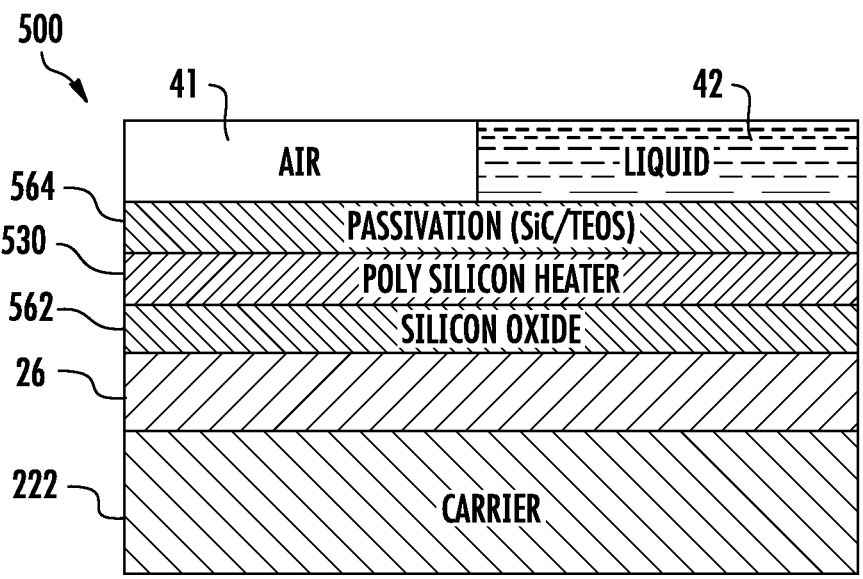
FIG. 8 is a sectional view of the example liquid interface of FIG. 6.

FIGS. 6-8 illustrate liquid level sensor 500, one example of the liquid level sensor 200. FIG. 6 is a diagram illustrating a portion of liquid interface 224. FIG. 7 is a circuit diagram of sensor 500. FIG. 8 is a sectional view through liquid interface 224 of FIG. 6 taken along lines 8-8. As shown by FIG. 6, liquid interface 224 is similar to liquid interface 24 described above in that liquid interface 224 comprises strip 26 which supports a series of heaters 530 and a series of temperature sensors 534. In the example illustrated, heaters 530 and temperature sensors 534 are interdigitated or interleaved along the length L of strip 26, wherein the length L is the major dimension of strip 26 to extend across different depths when sensor 500 is being used. In the example illustrated, each sensor 534 is spaced from its associated or corresponding heater 530 by a spacing distance S, as measured in a direction along the length L, of less than or equal to 20 µm and nominally 10 µm. In the example illustrated, the sensors 534 and their associated heaters 530 are arranged in pairs, wherein the heaters 530 of adjacent pairs are separated from one another by a distance D, as measured in a direction along the length L of at least 25 µm to reduce thermal cross talk between consecutive heaters. In one implementation, consecutive heaters 530 are separated from one another by a distance D of between 25 µm and 2500 µm, and nominally 100 µm.

As shown by FIG. 7, in the example illustrated, each heater 530 comprises an electrical resistor 550 which may be selectively turn on and off through the selective actuation of a transistor 552. Each sensor 534 comprises a diode 560. In one implementation, diode 560, serving as temperature sensors, comprise a P-N junction diode. Each diode 550 has a characteristic response to changes in temperature. In particular, each diode 550 has a forward voltage that changes in response to changes in temperature. Diode 550 exhibit a nearly linear relationship between temperature and applied voltage. Because temperature sensors 530 comprise diodes or semiconductor junctions, sensor 500 has a lower cost and they can be fabricated upon stripper 26 using semiconductor fabrication techniques.

FIG. 8 is a sectional view of a portion of one example of sensor 500. In the example illustrated, strip 26 is supported by carrier 222 (described above). In one implementation, strip 26 comprises silicon while carrier 122 comprises a polymer or plastic. In the example illustrated, heater 530 comprises a polysilicon heater which is supported by strip 26, but separated from strip 26 by an electrically insulating layer 562, such as a layer of silicon dioxide iln the example illustrated, heater 530 is further encapsulated by an outer passivation layer 564 which inhibits contact of between heater 530 and the liquid being sensed. Layer 564 protects heater 530 and sensors 534 from damage that would otherwise result from corrosive contact with the liquid or ink being sensed. In one implementation, the outer passivation layer 564 comprises silicon carbide and/or tetraethyl orthosilicate (TEOS). In other implementations, layers 562, 564 may be omitted or may be formed from other materials.

As shown by FIGS. 7 and 8, the construction of sensor 500 creates various layers or barriers providing additional thermal resistances R. The pulse of heat emitted by heater 530 is transmitted across such thermal resistances to the associated sensor 534. The rate at which the heat from a particular heater 530 is transmitted to the associated sensor 534 varies depending upon whether the particular heater 530 is bordered by air 41 or liquid 42. Signals from sensor 534 will vary depending upon whether they were transmitted across air 41 are liquid 42. Differences signals are used to determine the current level of liquid within a volume.

FIGS. 9A, 9B and 9C illustrate liquid interfaces 624 and 644, other example implementations of liquid interface 24. In FIG. 9A, heaters and sensors are arranged in pairs labeled 0, 1, 2, . . . N. Liquid interface 624 is similar to liquid interface 24 except that rather than being interleaved or interdigitated vertically along the length of strip 26, heaters 30 and sensors 34 are arranged in an array of side-by-side pairs vertically along the length of strip 26.

FIGS. 9B and 9C illustrate liquid interface 644, another example implementation of liquid interface 24. Liquid interface 644 similar to liquid interface 24 except that the heaters 30 and sensors 34 are arranged in an array of stacks vertically spaced along the length of strip 26. FIG. 9C is a sectional view of interface 644 further illustrating the stacked arrangement of the pairs of heaters 30 and sensors 34.

FIGS. 9A-9C additionally illustrate an example pulsing of the heater 30 of heater/sensor pair 1 and the subsequent dissipation of heat through the adjacent materials. In FIGS. 9A-9C, the temperature or intensity of the heat dissipates or declines as the heat travels further away from the source of the heat, heater 30 of heater/sensor pair 1. The dissipation of heat is illustrated by the change crosshatching in the Figures.

FIG. 10 illustrate a pair of time synchronized graphs of the example pulsing shown in FIGS. 9A-9C. FIG. 10 illustrates the relationship between the pulsing of the heater 30 of heater sensor pair 1 and the response over time by sensors 34 of heater/sensor pairs 0, 1 and 2. As shown by 10, the response of each of sensors 34 of each pairs 0, 1 and 2 varies depending upon whether air or liquid is over or adjacent to the respective heater/sensor pair 0, 1 and 2. The characteristic transient curve and magnitude scale differently in the presence of air versus the presence of liquid. As a result, signals from interface 644, as well as other interfaces such as interfaces 24 and 624, indicate the level of liquid within the volume.

In one implementation, a controller, such as controller 230 described above, determines a level of liquid within the sensed volume by individually pulsing the heater 30 of a pair and comparing the magnitude of the temperature, as sensed from the sensor of the same pair, relative to the heater pulsing parameters to determine whether liquid or air is adjacent to the individual heater/sensor pair. Controller 230 carries out such pulsing and sensing for each pair of the array until the level of the liquid within the sensed volume is found or identified. For example, controller 230 may first pulse heater 30 of pair 0 and compare the sensed temperature provided by sensor 34 of pair 0 to a predetermined threshold. Thereafter, controller 30 may pulse heater 30 of pair 1 and compare the sensed temperature provided by sensor 34 of pair 1 to a predetermined threshold. This process is repeated until the level of the liquid is found or identified.

In another implementation, a controller, such as controller 230 described above, determines a level of liquid within the sensed volume by individually pulsing the heater 30 of a pair and comparing multiple magnitudes of temperature as sensed by the sensors of multiple pairs. For example, controller 230 may pulse the heater 30 of pair 1 and thereafter compare the temperature sensed by sensor 34 of pair 1, the temperature sensed by sensor 34 of pair 0, the temperature sensed by sensor 34 of pair 2, and so on, each temperature resulting from the pulsing of the heater 30 of pair 1. In one implementation, the controller may utilize the analysis of the multiple magnitudes of temperature from the different sensors vertically along the liquid interface, resulting from a single pulse of heat, to determine whether liquid or air is adjacent to the heater sensor pair having the heater that was pulsed. In such an implementation, controller 230 carries out such pulsing and sensing by separately pulsing the heater of each pair of the array and analyzing the resulting corresponding multiple different temperature magnitudes until the level of the liquid within the sensed volume is found or identified.

In another implementation, the controller may determine the level of liquid within the sensed volume based upon the differences in the multiple magnitudes of temperature vertically along the liquid interface resulting from a single heat pulse. For example, if the magnitude of temperature of a particular sensor drastically changes with respect to the magnitude of temperature of an adjacent sensor, the drastic change may indicate that the level of liquid is at or between the two sensors. In one implementation, the controller may compare differences between the temperature magnitudes of adjacent sensors to a predefined threshold to determine whether the level liquid is at or between the known vertical locations of the two sensors.

In yet other implementations, a controller, such as controller 230 described above, determines the level of liquid within the sensed volume based upon the profile of a transient temperature curve based upon signals from a single sensor or multiple transient temperature curves based upon signals from multiple sensors. In one implementation, a controller, such as controller 230 described above, determines a level of liquid within the sensed volume by individually pulsing the heater 30 of a pair and comparing the transient temperature curve, produced by the sensor of the same pair, relative to the predefined threshold or a predefined curve to determine whether liquid or air is adjacent to the individual heater/sensor pair. Controller 230 carries out such pulsing and sensing for each pair of the array until the level of the liquid within the sensed volume is found or identified. For example, controller 230 may first pulse heater 30 of pair 0 and compare the resulting transient temperature curve produced by sensor 34 of pair 0 to a predetermined threshold or predefined comparison curve. Thereafter, controller 30 may pulse heater 30 of pair 1 and compare the resulting transient temperature curve produced by sensor 34 of pair 1 to a predetermined threshold or predefined comparison curve. This process is repeated until the level of the liquid is found or identified.

In another implementation, a controller, such as controller 230 described above, determines a level of liquid within the sensed volume by individually pulsing the heater 30 of a pair and comparing multiple transient temperature curves produced by the sensors of multiple pairs. For example, controller 230 may pulse the heater 30 of pair 1 and thereafter compare the resulting transient temperature curve produced sensor 34 of pair 1, the resulting transient temperature curve produced by sensor 34 of pair 0, the resulting transient temperature curve produced by sensor 34 of pair 2, and so on, each transient temperature curve resulting from the pulsing of the heater 30 of pair 1. In one implementation, the controller may utilize the analysis of the multiple transient temperature curves from the different sensors vertically along the liquid interface, resulting from a single pulse of heat, to determine whether liquid or air is adjacent to the heater sensor pair having the heater that was pulsed. In such an implementation, controller 230 carries out such pulsing and sensing by separately pulsing the heater of each pair of the array and analyzing the resulting corresponding multiple different transient temperature curves until the level of the liquid within the sensed volume is found or identified.

In another implementation, the controller may determine the level of liquid within the sensed volume based upon the differences in the multiple transient temperature curves produced by different sensors vertically along the liquid interface resulting from a single heat pulse. For example, if the transient temperature curve of a particular sensor drastically changes with respect to the transient temperature curve of an adjacent sensor, the drastic change may indicate that the level of liquid is at or between the two sensors. In one implementation, the controller may compare differences between the transient temperature curves of adjacent sensors to a predefined threshold to determine whether the level liquid is at or between the known vertical locations of the two sensors.

Figure 12:
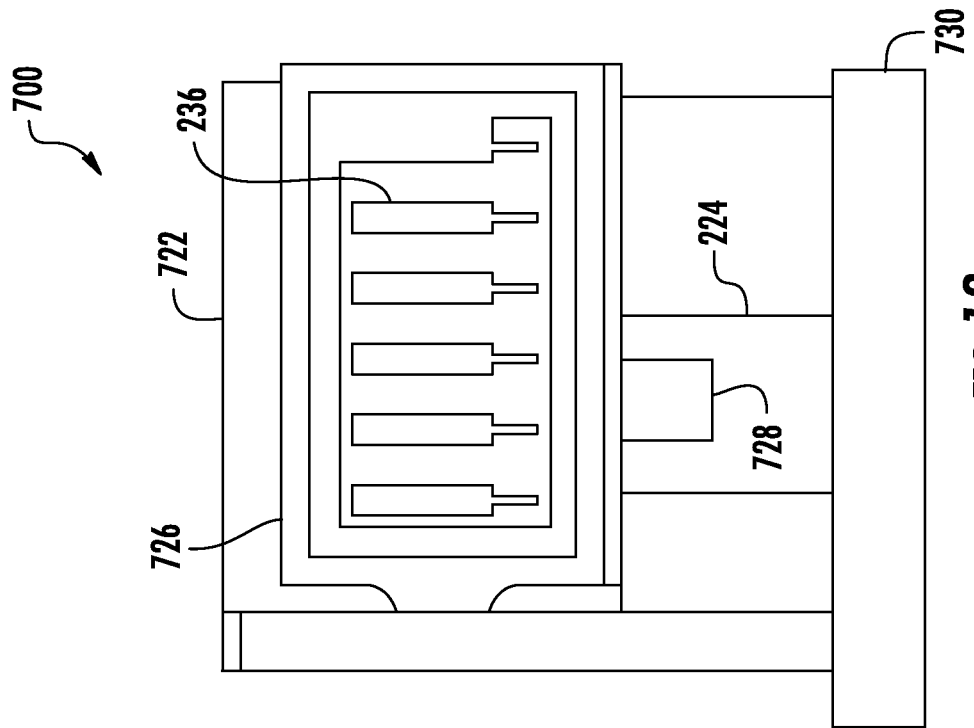
FIG. 12 is an enlarged view of a portion of the example liquid level sensor of FIG. 11.
Figure 11:
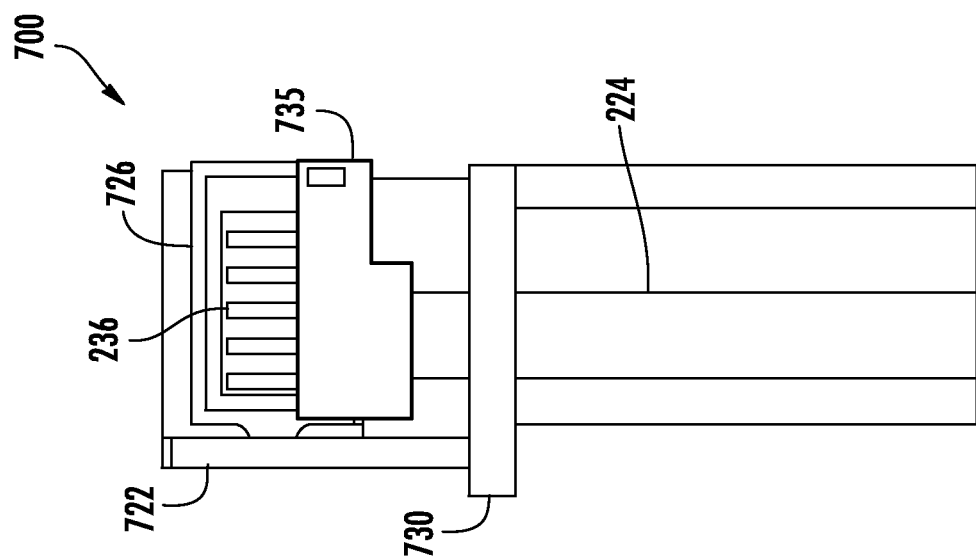
FIG. 11 is a diagram of another example liquid level sensor.

FIGS. 11 and 12 illustrate sensor 700, an example implementation of sensor 500. Sensor 700 comprises carrier 722, liquid interface 224, electrical interface 726, driver 728 and collar 730. Carrier 722 is similar to carrier 222 described above. In the example illustrated, carrier 722 comprises a molded polymer. In other implementations, carrier 722 may comprise a glass or other materials.

Liquid interface 224 is described above. Liquid interface 224 is bonded, glued or otherwise adhered to a face of carrier 722 along the length of the carrier 722. Carrier 722 may be formed from, or comprise, glass, polymers, FR4 or other materials.

Electrical interconnect 226 comprises a printed circuit board having electrical contact pad 236 are making electrical connection with controller 230 (described above with respect to FIGS. 3-5). In the example illustrated, electrical interconnect 226 is bonded or otherwise adhered to carrier 722. Electrical interconnect 226 is electrically connected to driver 728 as well as the heaters 530 and sensors 534 of liquid interface 224. Driver 728 comprises an application-specific integrated circuit (ASIC) which drives heaters 530 and sensors 534 in response to signals received through electrical interconnect 726. In other implementations, the driving of heaters 530 and the sensing by sensors 534 may alternatively be controlled by a fully integrated driver circuit in lieu of an ASIC.

Collar 730 extends about carrier 722. Collar 730 serves as a supply integration interface between carrier 722 and the liquid container in which sensor 700 is used to detect level of liquid within a volume. In some implementations, collar 730 provides a liquid seal, separating liquid contained within the volume that is being sensed and the interconnect 726. As shown by FIG. 11, in some implementations, driver 728 as well as the electrical connections between driver 728, liquid interface 224 and electrical interconnect 722 are further covered by a protective electrically insulating wire bond adhesive or encapsulant 735 such as a layer of epoxy mold compound.

Figure 13:
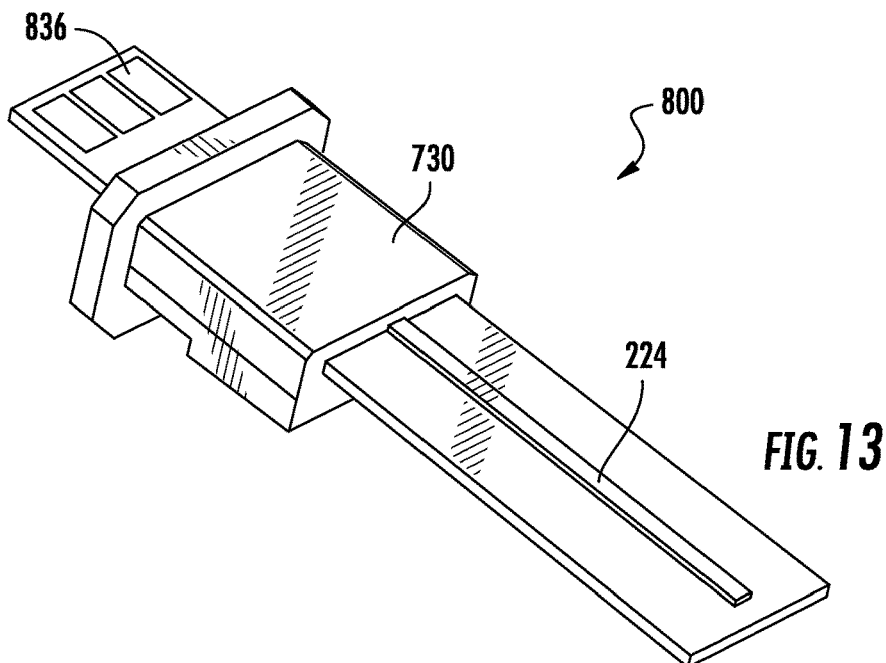
FIG. 13 is a perspective view of another example liquid level sensor.
Figure 14:
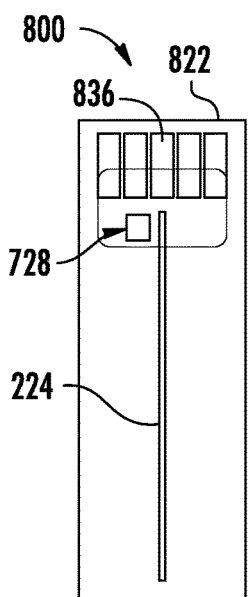
FIG. 14 is a front view of the example liquid level sensor of FIG. 13.
Figures 15, 17:
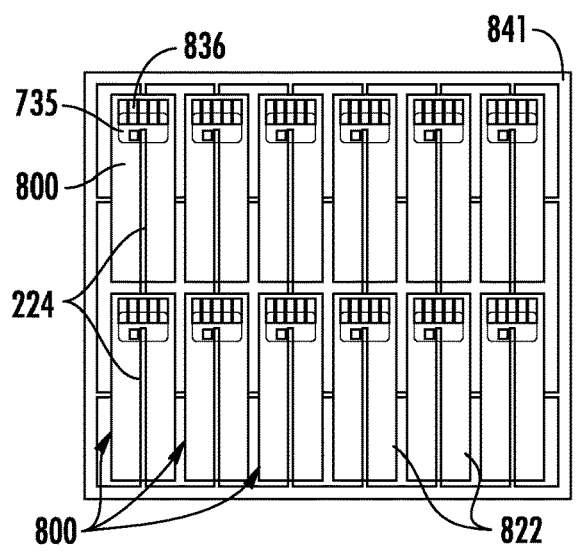
FIG. 15 is a sectional view of the example liquid level sensor of FIG. 14.
FIG. 17 is a front view of an example panel upon which multiple liquid level sensors have been formed, prior to singulation.

FIGS. 13-15 illustrate sensor 800, another implementation of sensor 500. Sensor 800 is similar to sensor 700 except that sensor 800 comprises carrier 822 in place of carrier 722 and omits the electrical interconnect 726. Carrier 822 comprises a printed circuit board or other structure having embedded electrical traces and contact pads to facilitate electrical connection between various electronic components mounted upon carrier 722. In one implementation, carrier 822 comprises a composite material composed of woven fiberglass cloth with an epoxy resin binder. In one implementation, carrier 222 comprises a glass-reinforced epoxy laminate sheet, tube, rod or printed circuit board, such as an FR4 printed circuit board.

As shown by FIGS. 14 and 15, liquid interface 224 is an easily bonded to carrier 822 by a die attach adhesive 831. Liquid interface 224 is further wire bonded to the acumen are driver 728 and the electrical contact pads relate 36 provided as part of carrier 822. Encapsulant 735 overlays or covers the wire bonds between liquid interface 224, driver 728 and the electrical contact pads 836. As shown by FIG. 13, collar 730 is positioned about encapsulant 735 between a lower end of liquid interface 224 and the elect contact pads 836.

Figure 16:
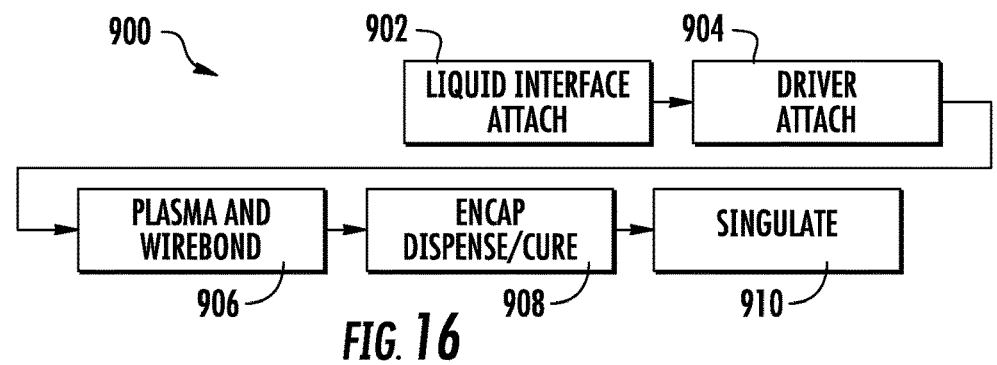
FIG. 16 is a flow diagram of an example method for forming the example liquid level sensor of FIG. 13.
Figure 18A:
FIGS. 18A-18E are sectional views illustrating the example liquid level sensor of FIG. 13 as it is being formed.
Figure 18B:
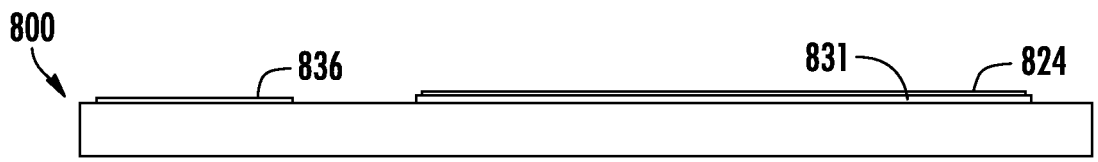

FIGS. 16, 17 and 18A-18E illustrate one example method for forming sensor 800. FIG. 16 illustrates method 900 for forming sensor 800. As indicated by block 902, liquid interface 224 is attached to carrier 822. As indicated by block 904, driver 728 is also attached to carrier 822. FIG. 18A illustrates carrier 822 prior to the attachment of liquid interface 224 and driver 728. FIG. 18B illustrate sensor 800 after the attachment of interface 224 and driver 728 (shown in FIG. 14) with adhesive layer 831. In one implementation, the adhesive layer 831 is stamped upon carrier 822 to precisely locate the adhesive 831. In one implementation, the attachment of liquid interface to 24 and driver 728 further includes curing of the adhesive.

Figure 18C:
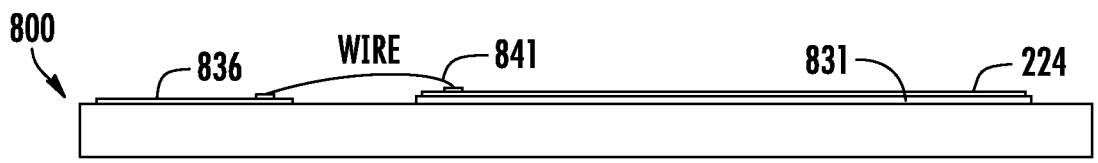
Figure 18D:
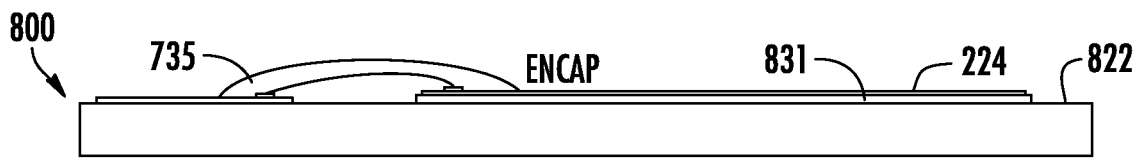
Figure 18E:
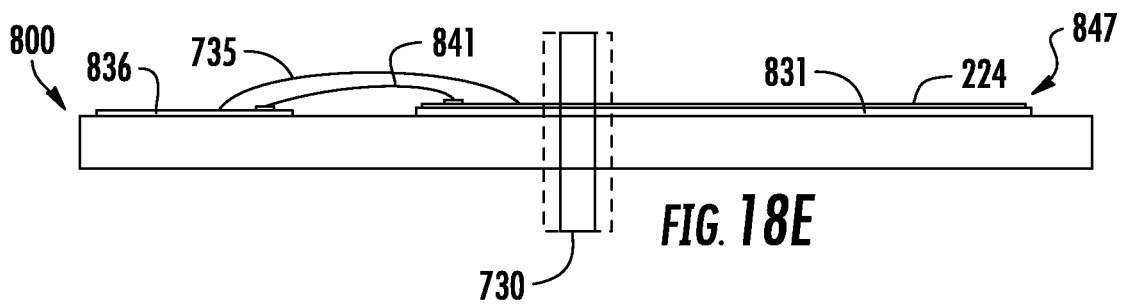

As indicated by block 906 of FIG. 16, liquid interface 224 is wire bonded to contact pads 836 of carrier 822 serving as an electrical interconnect. As indicated by block 908 in FIG. 16, the wire bonds 841 shown in FIG. 18C are then encapsulated within encapsulant 735. In one implementation, the encapsulant is cured. As shown by FIG. 17, in one implementation, multiple sensors 800 may be formed as part of a single panel 841. For example, a single FR4 panel having electrically conductive traces and contact pads for multiple sensors 800 may be used as a substrate upon which liquid interfaces to 24, drivers 728, and encapsulant may be formed. As indicated by block 910 FIG. 16, in such an implementation, the individual sensors 800 are singulated from the panel. As illustrated by FIG. 18E, in applications where the sensor 800 is to be incorporated as part of a liquid or fluid supply, collar 730 is further secured to carrier 822 between the wire bonds 841 and the lower end 847 of liquid interface 224. In one implementation, collar 730 is adhesively bonded to carrier 822 by an adhesive that is subsequently cured.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A liquid container comprising:
a chamber forming a volume to contain a liquid;
an elongated strip extending into the volume, the strip supported along a side of the volume such that a face of the strip adjacent the side of the volume is not opposed by the liquid in the volume;
a plurality of heaters supported by the strip along the strip;
a plurality of temperature sensors supported by the strip along the strip, wherein the plurality of heaters and the plurality of temperature sensors are supported by a first surface of the strip, wherein the temperature sensors are to output signals indicative of dissipation of heat from the heaters to indicate a level of the liquid in the volume;
a carrier supporting the strip;
an electrical interconnect electrically connected to the temperature sensors; and
a collar extending about the carrier and providing a liquid seal to separate the liquid in the volume from the electrical interconnect.

2. The liquid container of claim 1, wherein the plurality of heaters and the plurality of temperature sensors form a plurality of stacks supported by the first surface of the strip, each respective stack in the plurality of stacks comprising a respective heater and a respective temperature sensor that are one over another in respective different layers above the first surface of the strip.

3. The liquid container of claim 1, wherein the electrical interconnect comprises contact pads.

4. The liquid container of claim 1, wherein the electrical interconnect is covered by an electrically insulating encapsulant.

5. The liquid container of claim 1, wherein the electrical interconnect is covered by an electrically insulating adhesive.

6. The liquid container of claim 1, further comprising:
a driver to drive the heaters and the temperature sensors in response to signals received through the electrical interconnect.

7. The liquid container of claim 6, wherein the driver comprises an application-specific integrated circuit (ASIC).

8. The liquid container of claim 6, wherein the driver, the electrical interconnect, the heaters, and the temperature sensors are covered by an electrically insulating adhesive or encapsulant.

9. The liquid container of claim 1, wherein the strip comprises silicon.

10. The liquid container of claim 1, wherein each of the heaters comprises a resistor.

11. The liquid container of claim 1, wherein the plurality of heaters comprises a first heater, and wherein the plurality of temperature sensors comprises a temperature sensor spaced from the first heater by less than or equal to 20 µm.

12. The liquid container of claim 1, wherein activation of each respective heater of the plurality of heaters generates a heat pulse for sensing by a respective temperature sensor of the plurality of temperature sensors.

13. A liquid container comprising:
a chamber forming a volume to contain a liquid;
an elongated strip extending into the volume, the strip supported along a side of the volume such that a face of the strip adjacent the side of the volume is not opposed by the liquid in the volume;
a plurality of heaters supported by the strip along the strip;
a plurality of temperature sensors supported by the strip along the strip, wherein the plurality of heaters and the plurality of temperature sensors are supported by a first surface of the strip, wherein the temperature sensors are to output signals indicative of dissipation of heat from the heaters to indicate a level of the liquid in the volume; and
a carrier, wherein the strip is glued to the carrier.

14. The liquid container of claim 13, further comprising:
an electrical interconnect to communicate with a controller; and
an encapsulant covering the plurality of heaters, the plurality of temperature sensors, and the electrical interconnect.

15. The liquid container of claim 14, further comprising a driver to drive the heaters and the temperature sensors in response to signals received through the electrical interconnect,
wherein the encapsulant further covers the driver.

16. A liquid container comprising:
a chamber forming a volume to contain a liquid;
an elongated strip extending into the volume, the strip supported along a side of the volume such that a face of the strip adjacent the side of the volume is not opposed by the liquid in the volume;
a plurality of heaters supported by the strip along the strip;
a plurality of temperature sensors supported by the strip along the strip, wherein the plurality of heaters and the plurality of temperature sensors are supported by a first surface of the strip, wherein the temperature sensors are to output signals indicative of dissipation of heat from the heaters to indicate a level of the liquid in the volume; and
a carrier, wherein the strip is adhered to the carrier, and the carrier is suspended from a top of the chamber.

17. The liquid container of claim 16, further comprising:
an electrical interconnect electrically connected to the temperature sensors, the electrical interconnect comprising a printed circuit board, the printed circuit board to electrically connect to a controller.

18. The liquid container of claim 16, further comprising:
an electrical interconnect electrically connected to the temperature sensors; and
a collar extending about the carrier and providing a liquid seal to separate the liquid in the volume from the electrical interconnect.

19. A liquid container comprising:
a chamber forming a volume to contain a liquid;
an elongated strip extending into the volume, the strip supported along a side of the volume such that a face of the strip adjacent the side of the volume is not opposed by the liquid in the volume;
a plurality of heaters supported by the strip along the strip;
a plurality of temperature sensors supported by the strip along the strip, wherein the plurality of heaters and the plurality of temperature sensors are supported by a first surface of the strip, wherein the temperature sensors are to output signals indicative of dissipation of heat from the heaters to indicate a level of the liquid in the volume; and
a carrier supporting the elongated strip, wherein the elongated strip comprises:
a first layer supporting the plurality of heaters; and
a second layer supporting the plurality of temperature sensors.

20. The liquid container of claim 19, further comprising:
an electrical interconnect to communicate with a controller; and
an encapsulant covering the plurality of heaters, the plurality of temperature sensors, and the electrical interconnect.

\* \* \* \* \*